United States Patent Office 3,337,553
Patented Aug. 22, 1967

3,337,553
VAT DYESTUFFS CONTAINING ANTHRA-QUINONE NUCLEI
Hans Altermatt, Reinach, Basel-Land, Switzerland, assignor to Ciba Limited, Basel, Switzerland, a Swiss company
No Drawing. Filed Jan. 14, 1964, Ser. No. 337,520
Claims priority, application Switzerland, Oct. 28, 1960, 12,112/60
5 Claims. (Cl. 260—256.5)

This application is a continuation in part of my application Ser. No. 147,139, filed Oct. 24, 1961, now abandoned, and of my application Ser. No. 216,749, filed Aug. 14, 1962, now abandoned.

The present invention provides new, valuable vat dyestuffs which contain one, preferably acidic, water-solubilizing group and a single —CONH-bridge between two anthraquinone nuclei at least one of which bears a member selected from the group consisting of the aryloxy and the arylmercapto groups.

The aryl radical of the aryloxy and arylmercapto groups is preferably a mono- or bi-cyclic aromatic radical, such as the naphthyl and the phenyl radicals which may contain simple substituents, for example, a lower alkyl (such as methyl), a lower alkoxy (such as methoxy or ethoxy), a phenyl, phenoxy, benzyl or a chlorine or bromine substituent.

The term "vat dyestuff" includes dyestuffs that can be converted by reduction into a so-called leuco-form or vat, which form has a better affinity for natural or regenerated cellulose fibers than has the un-reduced form, and that can be re-oxidized to the original chromophore system. Suitable vat dyestuffs are especially those of the anthraquinone series, for example those containing two unchanged 9:10-dioxoanthracene rings, or those anthraquinones on to which carboxylic- and/or heterocyclic rings are condensed. In addition to the said aryloxy and arylmercapto groups the anthraquinone nuclei may also contain substituents usual in vat dyestuffs such, for example, as halogen atoms, alkoxy-, acylamino- or alkyl groups.

By water-solubilizing groups are meant stable groups present in permanently soluble dyestuffs, such as the sulfonic acid and the carboxylic acid groups which are preferably bound to the aryloxy or to the arylmercapto group of the dyestuff molecule. The dyestuff of the invention which are especially valuable are consequently those consisting of a single —NH—CO-bridge between two anthraquinones at least one of which bears a member selected from the group consisting of the sulfonaphthyloxy, the sulfonaphthylmercapto, sulfophenyloxy, sulfophenylmercapto, carboxyphenyloxy and carboxyphenylmercapto radicals.

The dyestuffs of the invention are prepared by introducing an arylmercapto group into a vat dyestuff and, if desired, at the same time introducing a water-solubilizing group should such a group not already be present in the vat dyestuff used as starting material, or by introducing at least one acidic water-solubilizing group, for example a sulfate- or sulfonic acid radical, into a vat dyestuff having only one —CO—NH-bridge between two anthraquinones at least one of which bears a member selected from the group consisting of the aryloxy and the arylmercapto groups.

The dyestuffs of the invention may also be made by acylation of an aminoanthraquinone which contains a member selected from the group consisting of the sulfonaphthyloxy, the sulfonaphthylmercapto, sulfophenyloxy, sulfophenylmercapto, carboxyphenyloxy and carboxyphenylmercapto radicals by means of an arthraquinone-carboxylic acid halide such as the chlorides of the anthraquinone-2-carboxylic acid, of the phenyloxy anthraquinone-2-carboxylic acids, of the phenylmercapto anthraquinone-2-carboxylic acids of the 1,9-anthrapyrimidine-2-carboxylic acid, of the pyrazoleanthrone-2-carboxylic acid, of the isothiazoleanthrone-2- and -4-carboxylic acids, of the 1-aminoanthraquinone-2-carboxylic acid and of the acids of the formula

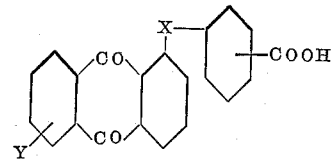

wherein X is an oxygen or sulfur atom and Y an aryloxy or arylmercapto group or a hydrogenatom with these acid halides 2-amino- or 1-aminoanthraquinones may be acylated which either contain a sulfonic acid or carboxylic acid group (such as for example the 1-amino-4-, -5- or -8-phenylmercaptoanthraquinone-3'- or -4'-sulfonic acid, or the 1-amino-4-, -5- or -8-phenylmercapto-anthraquinone-3'-carboxylic acid) or contain no such water-solubilizing groups but an aryloxy or arylthio group which is sulfonated after the acylation. The following compounds may, for example, be mentioned:

1-amino-4-(4'-methyl- or 4'-chloromethyl-phenylmercapto)-anthraquinone,
1-amino-5-(4'-methyl- or 3'-chlorophenylmercapto)-anthraquinone,
1-methylamino-4-(4'-chloromethyl-phenylmercapto)-anthraquinone,
1:4-diamino-2:3-di-(phenylmercapto)-anthraquinone,
1-amino-4-phenylmercapto-anthraquinone,
2-amino-6-phenylmercapto-anthraquinone,
1-amino-5-phenylmercapto-anthraquinone,
1-amino-6-phenylmercapto-anthraquinone,
1-amino-8-phenylmercapto-anthraquinone,
1-amino-7-phenylmercapto-anthraquinone,
1-amino-4- or 5-(α- or β-naphthylmercapto)-anthraquinone,
1-amino-4- or 5-(8'-chloronaphthyl(1')-mercapto)-anthraquinone,
1:5-diamino-4-phenylmercapto-anthraquinone,
1:4-diamino-5-phenylmercapto-anthraquinone,
1:5-diamino-4:8-diphenylmercapto-anthraquinone, as well as the corresponding aryloxy compounds.

According to the invention, the reaction between the above-mentioned acylating agent with the phenylmercapto-anthraquinone that contains an amino group, can ba carried out in an inert organic solvent, for example, nitrobenzene, chlorobenzene or ortho-dichlorobenzene, at a raised temperature. In many cases, the reaction can be carried out in an aqueous medium, advantageously in the presence of an acid-binding agent such, for example, as sodium acetate, sodium hydroxide or sodium carbonate. The starting materials are so chosen that the products obtained contain at least one acidic water-solubilizing group, for example, a sulfate-, sulfonic acid- or carboxyl group. When the starting material used are free from sulfonic acid- or carboxyl groups, one or several acidic water-solubilizing groups must be introduced into the vat dyestuff obtained, after the acylation. This introduction can be carried out in a number of ways.

An especially suitable method, because of its general applicability, for introducing acidic water-solubilizing groups is sulfonation; the sulfonation is very easily achieved, that is to say it can be carried out under very mild conditions. As such sulfonatable vat dyestuffs, there may above all be mentioned the aryloxy and arylmercapto derivatives of the acylamino-anthraquinone-, acedianthrone-, anthanthrone-, dibenzanthrone-, isodibenzanthrone-, flavanthrone-, pyranthrone-, benzanthrone-acridine- and anthrimide- or anthrimide-carbazole series.

Further modification of the present process: in a vat dyestuff which contains a single —NH—CO—bridge between 2 anthraquinone radicals, and which contains a substituent, for example a halogen atom, capable of being exchanged for an aryloxy or for an arylmercapto group that substituent is replaced for example by condensation with a sulfonaphthol, a sulfo- or carboxyphenol or above all with a sulfonaphthylmercaptan or with sulfo- or carboxythiophenols.

The vat dyestuffs of the invention, containing a stable water-solubilizing group, are suitable for dyeing a very wide variety of materials, such as synthetic or natural fibers, for example, cellulose ethers and esters, polyester fibers (Terylene or Dacron), polyamide fibers (nylon, etc.), polyacrylonitrile fibers (Orlon), and polyurethane fibers, and also wool and silk, but more especially they are suitable for dyeing or printing textile materials of natural or regenerated cellulose, dyeing being carried out by the so-called direct or exhaustion method or by padding.

The compounds of the invention that contain a substituent that reacts with the fiber can be fixed on wool or cellulose to give a fast dyeing, and the sulfoarylmercapto and derivatives with a low molecular weight yield valuable dyeings and prints especially on wool, silk and polyamides.

Notwithstanding their solubility in water, the vat dyestuffs of the invention yield on cellulosic fibers when applied by the vat dyeing method, that is to say, in the presence of an alkali and a reducing agent, dyeings and prints that are distinguished by their very good fastness to light, chlorine and wet treatments, especially by their excellent fastness to soda boiling and, as a rule, by their good levelness and good dyestuff penetration.

The dyeings and prints so obtained are also fast to dry cleaning and migration. The dyed fabrics can therefore be coated with synthetic resins, for example, polyvinyl chloride, without the dyestuff migrating into the resin, which is particularly important in the manufacture of artificial leather. Furthermore, there may also be mentioned the ease with which the compounds of the invention can be vatted, which makes for economy and simplicity of application.

As compared with the conventional vat dyestuffs, the vat dyestuffs of the invention have a better levelling and penetrating power. When used for dyeings in circulating liquor machines they do not give rise to faulty dyeings caused by the precipitation of reoxidized dyestuff even when foam is formed, and the pigmenting operation that is necessary in dyeing wound packages, for example, cheeses, or in dyeing tricots on a winch machine, with the conventional vat dyestuff, is omitted in the case of the dyestuffs of the invention. They can also be used in the form of solution in the fast-running pad-dyeings processes and, in this case they do not have to be in a finely dispersed commercial form or in the form of special pastes, so that the disadvantages of such forms (instability of the paste, dusting, and need for several operations to prepare finely divided powder) are eliminated. Finally, they can generally be vatted very easily, often at room temperature and, if required, with mild reducing agents. They possess a very good solubility in the vat, and yield strong and very level dyeings especially on regenerated cellulose that exhibit the same tint as the corresponding dyeings on cotton.

Unless otherwise stated, the parts and percentages in the following examples are by weight, and the relationship of parts by weight to parts by volume is the same as that of the gram to the millilitre.

Example 1

10.1 parts of anthraquinone-2-carboxylic acid, 3.2 parts by volume of thionyl chloride, 150 parts by volume of dry nitrobenzene are stirred at 120° C. for half an hour in the presence of traces of pyridine. 13.2 parts of 1-amino-5-phenylmercaptoanthraquinone are added at 90° C. to dissolve the acid chloride. The suspension is stirred for 3 hours at 140–145° C. On cooling, the reaction mixture is filtered, the filter cake is freed from nitrobenzene by being washed with methanol and is dried at 70° C. in vacuo.

5 parts of the dry dyestuff are strewed at room temperature into 35 parts by volume of oleum containing 5% of $SO_3$. As soon as a neutralized test portion is soluble in water, the batch is poured on to 200 parts of ice, filtered and the press cake washed neutral with dilute brine. The resulting dyestuff of the formula

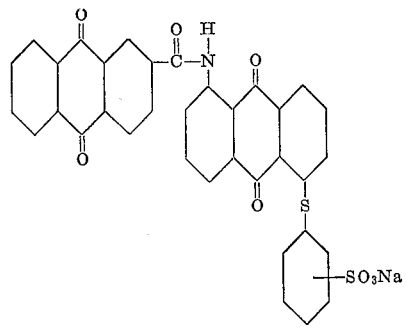

dyes cotton greenish yellow tints according to dyeing prescription A.

If, instead of 13.2 parts of 1-amino-5-phenylmercaptoanthraquinone, there are used the anthraquinones listed in column I of the table below in the amounts (parts) listed in column II, and sulfonation is carried out in the same way, analogous dyestuffs are obtained. The tint of the dyeings obtained according to the dyeing prescription A is shown in column III.

| I | II | III |
|---|---|---|
| 1-amino-4-phenylmercaptoanthraquinone | 13.2 | Orange. |
| 1-amino-8-phenylmercaptoanthraquinone | 13.2 | Yellow. |
| 1-amino-6-phenylmercaptoanthraquinone | 13.2 | Do. |
| 2-amino-5-phenylmercaptoanthraquinone | 13.2 | Do. |
| 2-amino-6-phenylmercaptoanthraquinone | 13.2 | Do. |
| 1-amino-5-(p-methylphenylmercapto)-anthraquinone | 13.8 | Do. |
| 1-amino-5-(3-chlorophenylmercapto)-anthraquinone | 14.3 | Do. |
| 1-amino-4-(1-naphthylmercapto)-anthraquinone | 15.2 | Red. |
| 1-amino-4-(2-naphthylmercapto)-anthraquinone | 15.2 | Red. |
| 1-amino-5-(2-naphthylmercapto)-anthraquinone | 15.2 | Yellow. |
| 1-amino-5-(8-chloro-1-naphthylmercapto)-anthraquinone | 16.5 | Do. |
| 1-amino-5-benzylmercaptoanthraquinone | 13.8 | Do. |
| 1-amino-5-phenoxyanthraquinone | 12.6 | Do. |
| 1-amino-4-phenoxyanthraquinone | 12.6 | Golden yellow. |
| 1-amino-4-phenylphenoxyanthraquinone | 16.6 | Do. |

Example 2

22 parts of 1-aminoanthraquinone are added to a solution of the acid chloride, prepared from 39 parts of 4 - (2′,5′-dimethylphenylmercapto)-anthraquinone-2-carboxylic acid, 8 parts by volume of thionyl chloride in 300 ml. of nitrobenzene, and the whole is stirred for 3 hours at 140–145° C. On cooling, the greenish yellow dyestuff is filtered off, thoroughly washed with methanol and dried at 80° C. in vacuo. 5 parts of the dry dyestuff are stirred at room temperature in 30 parts by volume of oleum containing 2% of $SO_3$ until a neutralized test portion is soluble in water. The dyestuff, worked up in the usual manner, corresponds to the formula

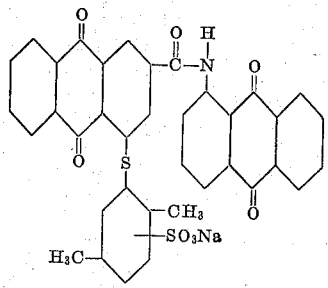

and dyes cotton yellow tints.

Example 3

10.5 parts of pyrazoleanthrone-2-carboxylic acid, 5.24 parts of thionyl chloride, 120 parts by volume of nitrobenzene are stirred at 120° C. for half an hour in the presence of pyridine. After the addition of 13.2 parts of 1-amino-5-phenyl-mercaptoanthraquinone, the batch is stirred at 140–145° C. for three hours. On cooling, the reaction mixture is filtered and the residue thoroughly washed with methanol.

5 parts of the resulting dyestuff are sulfonated as described in the second paragraph of Example 1.

The resulting dyestuff of the formula

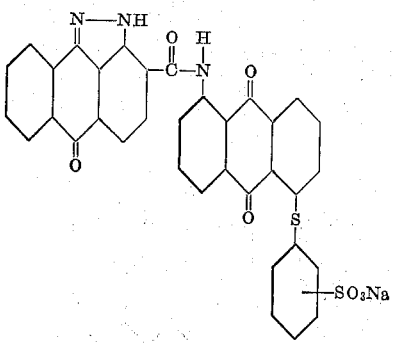

dyes cotton yellow tints. Instead of 1-amino-5-phenyl-mercaptoanthraquinone, the anthraquinone derivatives mentioned in column I of the table in Example 1 may be used.

Example 4

Instead of 10.1 parts of anthraquinone-2-carboxylic acid as described in Example 1, 11.25 parts of 1,9-isothiazoleanthrone-2-carboxylic acid are used. The resulting dyestuffs dye cotton a somewhat darker tint.

Example 5

If in Example 4 1,9-isothiazoleanthrone-2-carboxylic acid is replaced by 1,9-isothiazole-4-carboxylic acid, dyestuffs with analogous properties are obtained.

Example 6

Instead of 10.1 parts of anthraquinone-2-carboxylic acid as described in Example 1, 11 parts of 1,9-anthrapyrimidine-2-carboxylic acid are used. The resulting dyestuffs dye cotton yellow to orange tints by the method described in dyeing prescription A.

Example 7

28.7 parts of 1-chloro-5-nitroanthraquinone in 500 parts by volume of isopropanol are stirred with 15.5 parts of para-mercaptobenzoic acid and 12 parts of potassium hydroxide for 6 hours under reflux. On cooling, the reaction mass is poured into 5000 parts by volume of water and filtered until clear. The filtrate is treated with urea and then acidified to yield 1-chloro-5-(4'-carboxy-phenylmercapto)-anthraquinone.

39.7 parts of the above anthraquinone are stirred under reflux with 11 parts of thiophenol for 15 hours in 800 parts by volume of isopropanol in the presence of 12 parts of potassium hydroxide. After cooling, the carboxylic acid obtained by separation is converted in the customary manner with thionyl chloride into the acid chloride.

24.3 parts of the acid chloride are stirred for 3 hours at 150° C. with 11 parts of 1-aminoanthraquinone in 250 parts of trichlorobenzene containing 0.5 part of pyridine. On cooling, the yellow dyestuff of the formula

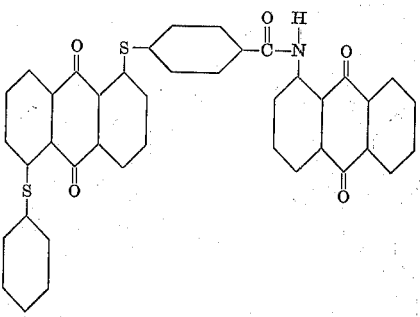

can be isolated which can be converted into a water-soluble yellow vat dyestuff by reprecipitation from oleum of 1% strength. It dyes cotton yellow tints having good fastness properties by the dyeing prescription A.

If, instead of 11 parts of 1-amino-anthraquinone, 13 parts of 1-amino-5-chloro-anthraquinone are used, a dyestuff having the same properties is obtained.

The dyestuff of the formula

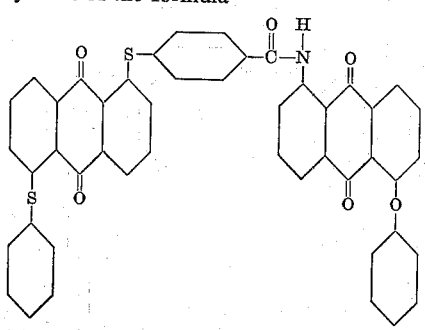

obtained by replacing 11 parts of 1-amino-anthraquinone by 15.8 parts of 1-amino-5-phenoxy-anthraquinone dyes cotton yellow tints after the customary sulfonation.

Example 8

3.1 parts of 1-amino-5-phenoxy-anthraquinone are added to a suspension of 3.7 parts of the dichloride of 2-carboxy-anthraquinone-6-sulfonic acid, 0.8 part of pyridine in 75 parts by volume of nitrobenzene and the whole stirred for 4 hours at 145–150° C. On cooling, the nitrobenzene is expelled with vapour and the residue vatted in an alkaline hydrosulfite solution. After oxidation with atmospheric oxygen the dyestuff of the formula

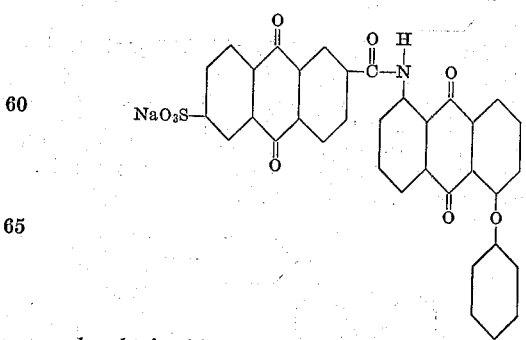

can be obtained by salting out. It dyes cotton yellow tints according to the dyeing prescription.

The 3.1 parts of 1-amino-5-phenoxy-anthraquinone may be replaced, for example, by 3.3 parts of 1-amino-5-phenylmercaptoanthraquinone, a yellow water-soluble dyestuff also being obtained.

Example 9

24.3 parts of the acid chloride of the formula described in Example 7 are stirred with 13.4 parts of 1-amino-5-nitroanthraquinone in 250 parts by volume of trichlorobenzene containing 0.5 part of pyridine for 3 hours at 145–150° C. On cooling, the yellow nitro compound is isolated by filtration and then converted by reduction in sodium sulfohydrate and water into the amine of the formula

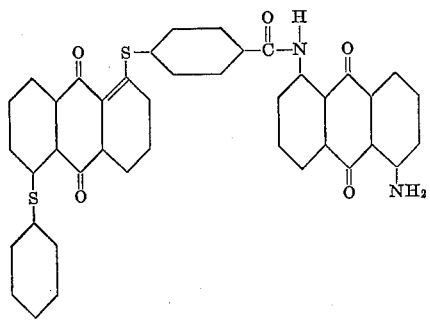

6.9 parts of the dry amine are added to a solution of 2.5 parts of benzoic acid m-sulfochloride in 100 parts by volume of pyridine and stirred for 8 hours under reflux. On cooling, the reaction mixture is filtered and thoroughly washed with dilute brine. The resulting dyestuff of the formula

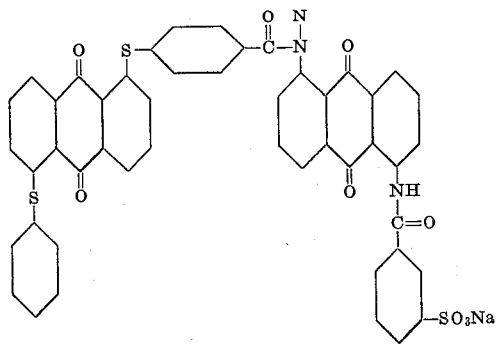

dyes cotton yellow tints according to the dyeing prescription.

Example 10

56.4 parts of the acid chloride of the constitution

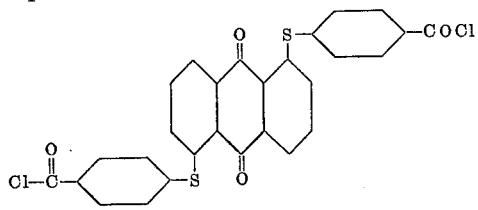

are stirred for 2 hours at 150° C. with 22.3 parts of 1-aminoanthraquinone in 750 parts of trichlorobenzene and the presence of 1 part of pyridine. On cooling the trichlorobenzene is distilled off with water vapour and the residue dissolved in dilute sodium hydroxide solution and filtered until clear. After acidification with acetic acid, the yellow vat dyestuff of the formula

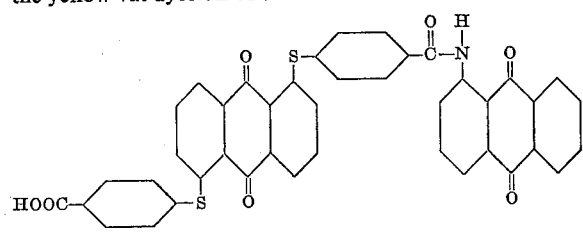

can be isolated. It dyes cotton yellow tints having good fastness properties.

Example 11

14.1 parts of isothiazoleanthrone-2-carboxylic acid and 5 parts by volume of thionyl chloride are stirred for half an hour at 150° C. in 125 parts by volume of trichlorobenzene containing 0.2 part of pyridine. On distilling off the excess thionyl chloride 18.7 parts of 1-amino-5-(3'-carboxy-phenylmercapto)-anthraquinone are added at 90° C. and the batch is stirred for 2 hours at 160° C. On cooling, the dyestuff is separated and worked up in the customary manner and has the formula

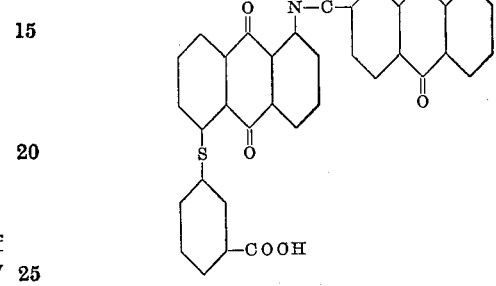

It dyes cotton yellow tints acording to the dyeing prescription.

Example 12

Instead of 10.1 parts of anthraquinone-2-carboxylic acid as described in Example 1, 10.6 parts of 1-aminoanthraquinone-2-carboxylic acid are used. The resulting dyestuff of the formula

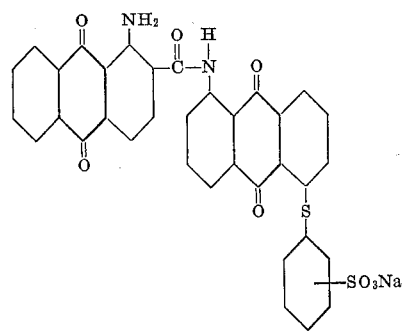

dyes cotton brickred tints according to dyeing prescription A.

DYEING PROCESS A 0.15 part of the dyestuff is added to 50 parts of water and then poured into a solution of 2 parts by volume of sodium hydroxide of 36° Bé. and 1.2 part of hydrosulfite in 350 parts of water, at 60° C. 10 parts of cotton are dyed for 45 minutes in the dye bath so obtained, with the addition of 12 parts of sodium chloride, the temperature being allowed to rise to 80° C. After dyeing, it is rinsed in running cold water until it has been exhaustively oxidized, and then acidified and soaped at the boil.

DYEING PROCESS B 0.3 part of the dyestuff dissolved in 50 parts by volume of water at 60° C., and the solution is poured into a solution at 50° C. containing 1 part by volume of a solution of sodium hydroxide of 36° Bé. and 0.7 part of sodium hydrosulfite in 350 parts by volume of water. 10 parts of silk are dyed for 45 minutes in the dye bath so obtained, at 50° C., with the addition of two lots of 6 parts of common salt. After the dyeing, the material is rinsed in running cold water until it has been completely oxidized, then acidified with acetic acid and finally soaped at the boil.

What is claimed is:
1. A vat dyestuff of the formula

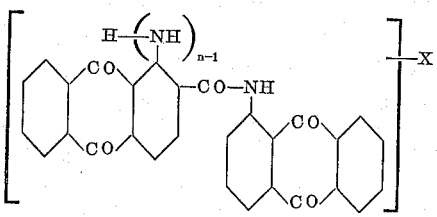

wherein $n$ is a whole positive number up to and including 2 and X is sulfophenylmercapto.

2. A vat dyestuff of the formula

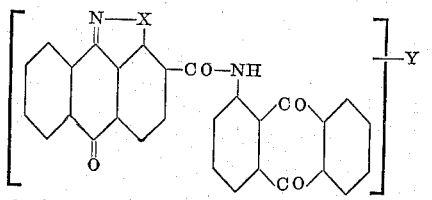

wherein X is a member selected from the group consisting of the —S— atom, the —NH— group and the group —CH=N—, Y being sulfophenylmercapto.

3. A vat dyestuff of the formula

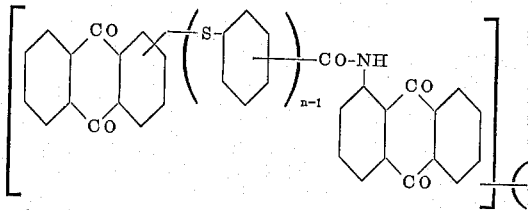

wherein $m$ and $n$ are whole positive numbers up to and including 2, X is a member selected from the group consisting of the sulfophenyloxy, sulfophenylmercapto and the sulfonaphthylmercapto groups.

4. The vat dyestuff of the formula

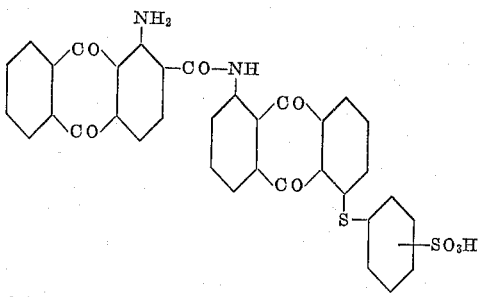

5. The vat dyestuff of the formula

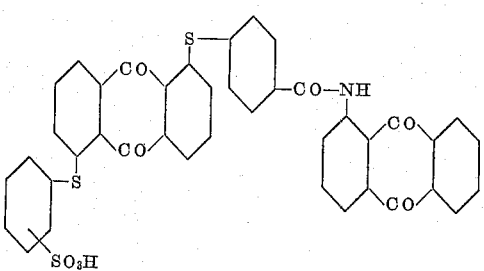

References Cited
UNITED STATES PATENTS

| | | | |
|---|---|---|---|
| 1,877,884 | 9/1932 | Kalischer et al. | 260—312 |
| 2,151,634 | 3/1939 | Baxbaum | 260—373 |
| 2,870,172 | 1/1959 | Schoenauer | 260—368 |

FOREIGN PATENTS

| | | |
|---|---|---|
| 1,333,261 | 6/1963 | France. |
| 766,407 | 1/1957 | Great Britain. |

ALEX MAZEL, *Primary Examiner.*
MARY U. O'BRIEN, *Assistant Examiner.*